G. J. HARTMANN.
FEED WIRE CONNECTION FOR ELECTRIC MOTORS.
APPLICATION FILED NOV. 11, 1911.
1,031,337.
Patented July 2, 1912.
2 SHEETS—SHEET 1.
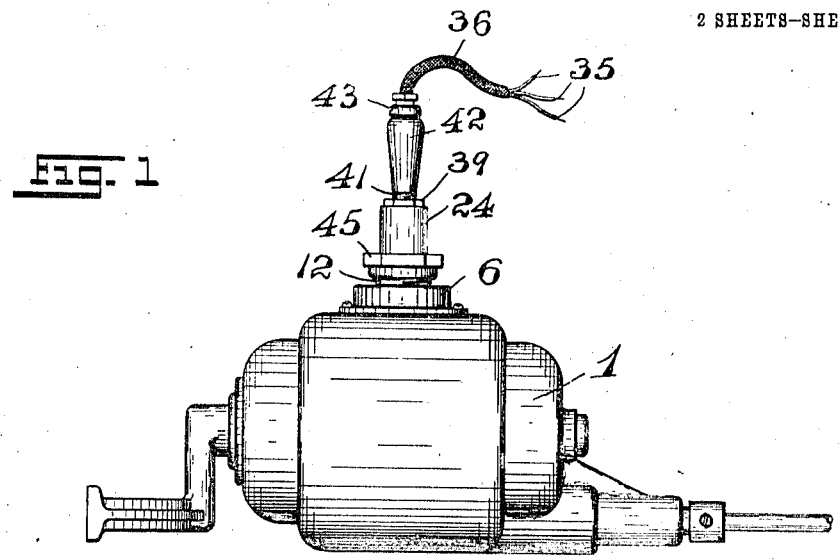
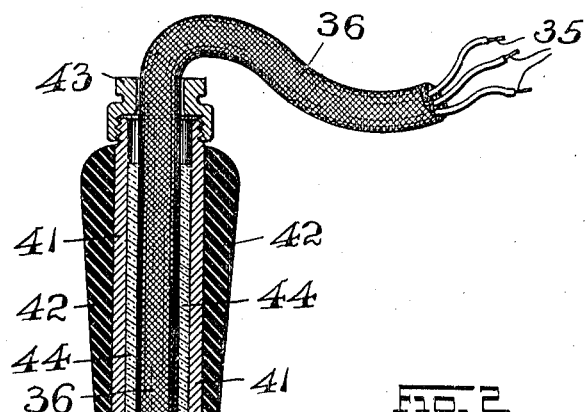
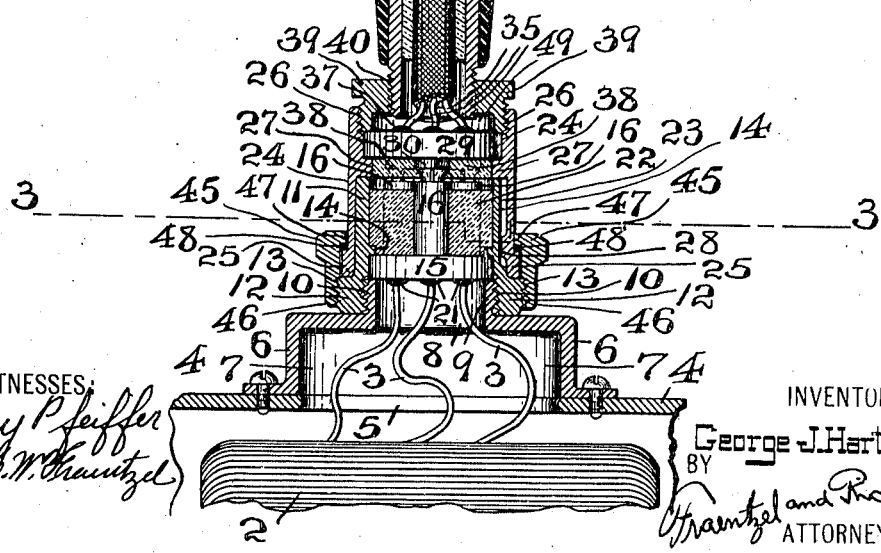
WITNESSES
Harry Pfeiffer
Fredk. W. Kraentzel
INVENTOR
George J. Hartmann
BY
Kraentzel and Richards,
ATTORNEYS G. J. HARTMANN.
FEED WIRE CONNECTION FOR ELECTRIC MOTORS.
APPLICATION FILED NOV. 11, 1911.
1,031,337.
Patented July 2, 1912
2 SHEETS—SHEET 2.
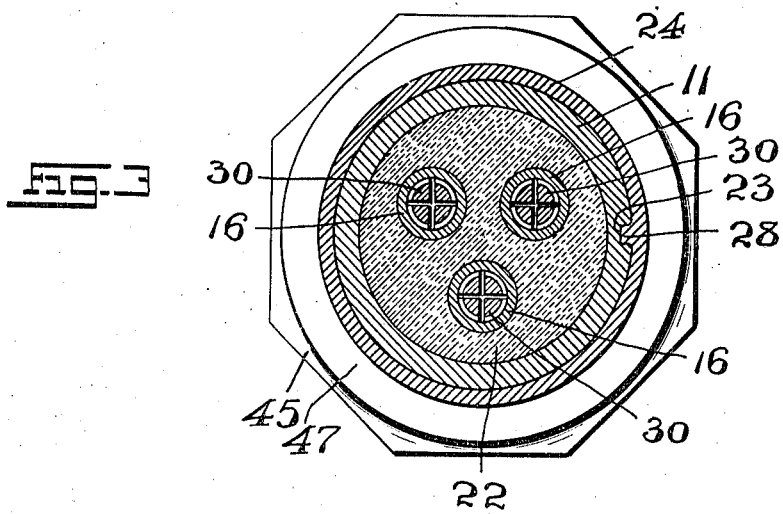
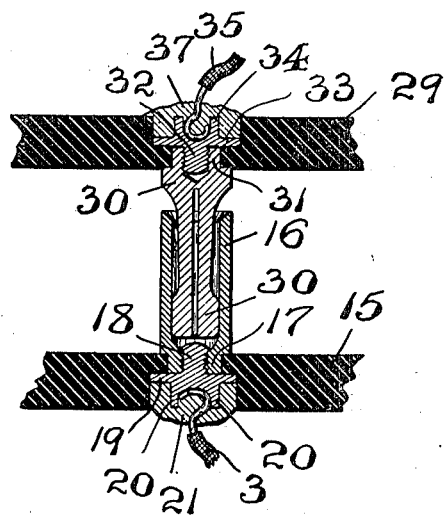
WITNESSES:
Harry Pfeiffer
Fredk. H. W. Fraentzel
INVENTOR:
George J. Hartmann,
BY
Fraentzel and Richards
ATTORNEYS

UNITED STATES PATENT OFFICE.

GEORGE J. HARTMANN, OF WHITE PLAINS, NEW YORK.

FEED-WIRE CONNECTION FOR ELECTRIC MOTORS.

1,031,337.   Specification of Letters Patent.   Patented July 2, 1912.

Application filed November 11, 1911. Serial No. 659,713.

*To all whom it may concern:*

Be it known that I, GEORGE J. HARTMANN, citizen of the United States, residing at White Plains, in the county of Westchester and State of New York, have invented certain new and useful Improvements in Feed-Wire Connections for Electric Motors; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in feed-wire connections for electric motors; and, the present invention has reference, more particularly, to a novel means for making a positive connection between the feed wire cable, connected with the service of potential, with the field wires of the electric motor.

The invention has for its principal object to provide a novel, simple, efficient, and durable coupling or connection, whereby slack cables containing feed-wires may be quickly and positively connected with the field wires of electric motors of the portable type, such for example, as portable electric-drill motors, vacuum-cleaner motors, and all other types of devices where the movements of either the motor or the slack feed-wire cable ordinarily subjects the contacting portions of the connection, or the wires themselves, to pulls or strains; which, if permitted to be exercised, frequently destroy the proper connections of feed-wires with the field-wires of the motor, to the injury and incapacitation of the motor.

The present invention has for a further object to provide a coupling or connection which provides a positive electrical connection between the feed-wires and the field-wires of motor which is moisture-proof, short circuit proof, and which prevents strains, pulls, or stresses to be communicated to the connections between the field-wires and the main line potential wires, due to accidental pulls, jars or vibration of the motor, or of the feed-wire cable.

Other objects of the present invention not at this time more particularly enumerated will be clearly understood from the following detailed description of the present invention.

With the various objects of the present invention in view, the said invention consists, primarily, in the electrical connection or coupling hereinafter set forth; and, furthermore, this invention consists in the arrangements and combinations of the various parts, as well as in the details of the construction thereof, all of which will be hereinafter more fully described, and then finally embodied in the clauses of the claims which are appended to and which form an essential part of this specification.

The invention is clearly illustrated in the accompanying drawings, in which:—

Figure 1 is a side elevation of an electric-drill, the motor of which is equipped with the construction of electrical connection or coupling for attaching the feed-wire cable to the field-wires of the motor; and Fig. 2 is a large detail longitudinal vertical section of said construction of electrical connection or coupling. Fig. 3 is a detail horizontal section of the same, on an enlarged scale, and taken upon line 3—3 in said Fig. 2; and Fig. 4 is a detail longitudinal vertical section, taken through one of the male and female contact-making devices, showing the same in their operative relations.

Similar characters of reference are employed in all of the hereinabove described views, to indicate corresponding parts.

Referring now to the several figures of the drawings, the reference-character 1 indicates the motor of an electric-drill in connection with which I have chosen to illustrate the application of my present invention. As shown, the said motor comprises the three-phase type, the field 2 being composed of a three-phase winding, the free ends of the field-wires 3 of which are connected with my construction of electrical connection or coupling presently to be more fully described. The motor-field is inclosed in a suitable casing 4 which is provided with an opening 5 through which the free ends of said field-wires are led. Secured to said casing, in any suitable manner, and in registration with said opening, is a base-block 6, the same being preferably hollowed out to form the chamber or air-space, as 7. Disposed in the upper portion of said base-block is an opening 8, from the marginal edges of which extends upwardly an exteriorly threaded annular flange or hub 9, to which is secured, by means of its interiorly threaded portion 10, a tubular shell 11. Said tubular shell is provided, at its lower end, with a flanged portion 12, the circumferential surface of which is provided with external screw-threads 13. Located within the interior of said shell, at any suitable point between its ends, is an annular rib 14, and arranged within said shell, so as to abut against the under side of said annular rib, is an insulator-disk 15, which may be made of any desired material which is a non-conductor of electricity. Carried by said insulator-disk are a series of upwardly projecting female contact-members 16, each of which is provided with an internally screw-threaded and reduced extension 17, extending into said insulator-disk, and adapted to receive the screw-threaded shank 18 of a lock-nut 19, which extends upwardly from the under side of said insulator-disk, said lock-nut being received in a countersunk opening in the under side of said insulator disk. Each lock-nut is provided with a socket-member 20, said socket-members being adapted to receive the free ends of the said field-wires 3, which are secured in place by means of solder 21, flooded over the same, or by any other suitable form of fastening means. Said shell 11 is filled with a water-proof insulating compound 22, in the space above said insulator disk, so that the same surrounds and protects the said upwardly extending female contact-members 16, said shell 11 being further provided upon its outer surface with a properly located vertical channel or groove 23.

The reference-character 24 indicates a telescoping shell which is adapted to be telescopically fitted over said first-mentioned shell, said shell 24 being provided at its lower end with an external annular rib or flange 25, and at its upper end with an internally screw-threaded portion 26. Located within the interior of said telescoping shell, at a desirable point between its ends, is an internal annular rib 27. Projecting from the inner side of said telescoping shell, and beneath the said internal annular rib 27, is a suitably located lug or key 28, which slidably engages said groove or channel 23 of said shell 11, and thus serves as a guiding means for properly assembling the respective shells 11 and 24 in their operative relations. Arranged within the upper portion of said telescoping shell 24, so as to rest upon said internal annular rib 27, is an insulator-disk 29, made of any suitable material which is a non-conductor of electricity. Carried by said insulator-disk 29 are a series of downwardly projecting male contact-members 30, each of which is provided with an internally screw-threaded reduced extension 31 extending into said insulator-disk 29, and adapted to receive the screw-threaded shank 32 of a lock-nut 33, which extends downwardly from the upper side of the said insulator-disk 29, said lock-nut being received in a countersunk opening in the upper side of said insulator disk. Each lock-nut 33 is provided with a socket-member 34, said members 34 being adapted to receive the free ends of the feed-wires 35, contained in a feed-wire cable 36, the said ends being secured in position by means of solder 37 flooded over the same, or by means of other suitable fastening means. The reference-character 38 indicates a water-proof insulating compound which is filled around the bases of said male contact-members, so as to fill the space beneath said insulator-disk 29 flush with the lower side of said internal annular rib 27. Engaging said internally screw-threaded portion 26 of said telescoping shell 24 is an externally threaded reducing union 39 which is formed with an internally screw-threaded opening 40 in which is received the lower screw-threaded end of a tubular member 41. Said tubular-member 41 forms the core upon which is mounted a hand-grasp or other suitable manipulating member 42 which is made of any desirable material that is a non-conductor of electricity. Connected with the upper screw-threaded end of said tubular member 41 is a perforated cap-member 43. Said feed-wire cable 36 extends upwardly through said tubular member 41, and out through the perforation of the said cap-member 43, said feed-wire cable 36 being embedded within the water-proof insulating compound 44 contained within said tubular member 41, whereby the said cable 36 is firmly and securely held in a manner to prevent the pulls and strains upon the same, in moving the motor from place to place, from being communicated to the feed-wires 35, where the same are connected with said male contact-members 30.

When the said shells 11 and 24 are assembled, so as to bring the respective female and male contact-members, arranged within the respective shells, in proper electrical contact or connection with each other, the two shells may be locked together by means of a lock-ring 45 which is provided at its lower end with an internally screw-threaded portion 46, adapted to engage the screw-threads 13 of said flanged portion 12 of the shell 11 for this purpose. The upper end of said lock-ring 45 is provided with an inwardly projecting annular flange 47 which engages said external annular rib or flange 25 of said telescoping shell 24, so as to draw the two shells together and lock them in their assembled relation, thereby holding the same rigidly and securely together, and preventing the communication of shocks, jars, pulls, or any other strains, from being communicated to the connected male and female contact-members, or to their respective connections with the feed wires and field-wires of the motor. If desired, packing material 48 may be inserted between said annular flange 47 and said annular rib or flange 25, as will be clearly evident. To disconnect the feed-wires from electrical connection with said motor field-wires, the said lock-ring 45 is disconnected; and the hand-grasp portion 42 is grasped to exert an upward pull upon said telescoping shell 24 which separates the same from the shell 11, and at the same time removes the said male contact-members from said female contact-members, so that the electrical connection is broken.

The air space 7 of said base-block provides a sufficient envelopment of air around the field-wire terminals to prevent over heating; and, in like manner, the air-space 49 formed in said reducing union 39 provides a sufficient envelopment of air around the feed-wire terminals to prevent over heating at that point.

I am aware that changes may be made in the various arrangements and combinations of the several devices and parts, as well as in the details of the construction of the said parts, without departing from the scope of the present invention as described in the foregoing specification, and as defined in the clauses of the claims which are appended thereto. Hence, I do not limit my invention to the exact arrangements and combinations of the various devices and parts as herein set forth in the said specification, nor do I confine myself to the exact details of the construction of the said parts, as illustrated in the accompanying drawings.

I claim:—

1. In a device of the character described, a shell, female contact-members mounted within said shell and insulated therefrom, a telescoping shell adapted to engage said first-mentioned shell, male contact-members mounted within said telescoping shell and insulated therefrom, means for rigidly locking said shells in their engaged relation, and guiding means connected with said shells for registering the same in proper relation with each other.

2. In a device of the character described, a shell, a base-block upon which said shell is mounted, an insulator-disk mounted within said shell, female contact-members carried by said insulator-disk, said base-block being provided with an opening through which wires may be introduced within said shell and respectively secured to said female contact-members, a telescoping shell adapted to engage said first-mentioned shell, an upwardly extending tubular member, means for connecting said tubular member with said telescoping shell, a hand-grasp portion connected with said tubular-member, an insulator-disk mounted within said telescoping shell, male contact-members carried by said insulator-disk, said tubular member providing means for introducing wires within said telescoping shell and respectively secured to said male contact-members, and means for rigidly locking said shells in their engaged relation.

3. In a device of the character described, a shell, a base-block upon which said shell is mounted, an insulator-disk mounted within said shell, female contact-members carried by said insulator-disk, said base-block being provided with an opening through which wires may be introduced within said shell and respectively secured to said female contact-members, a telescoping shell adapted to engage said first-mentioned shell, an upwardly extending tubular member, means for connecting said tubular member with said telescoping shell, a hand-grasp portion connected with said tubular-member, an insulator-disk mounted within said telescoping shell, male contact-members carried by said insulator-disk, said tubular member providing means for introducing wires within said telescoping shell and respectively secured to said male contact-members, means for rigidly locking said shells in their engaged relation, and guiding means connected with said shells for registering the same in proper relation with each other.

4. In a device of the character described, a shell, a base-block upon which said shell is mounted, an insulator-disk mounted within said shell, female contact-members carried by said insulator-disk, said base-block being provided with an opening through which wires may be introduced within said shell and respectively secured to said female contact-members, a telescoping shell adapted to engage said first-mentioned shell, an upwardly extending tubular member, means for connecting said tubular member with said telescoping shell, a hand-grip portion connected with said tubular-member, an insulator-disk mounted within said telescoping shell, male contact-members carried by said insulator-disk, said tubular member providing means for introducing wires within said telescoping shell and respectively secured to said male contact-members, means for rigidly locking said shells in their engaged relation, and guiding means connected with said shells for registering the same in proper relation with each other, comprising, a vertical channel exteriorly disposed upon said first-mentioned shell, and a key interiorly disposed upon said telescoping shell.

5. In a device of the character described, a rigidly secured tubular shell, an insulator-disk mounted therein, female contact-members supported by said insulator-disk, a removable telescoping tubular shell adapted to engage said rigidly secured tubular shell, an insulator-disk mounted within said telescoping tubular shell, male contact-members supported thereby, a cable-receiving means connected with said telescoping tubular shell, means for rigidly locking said telescoping tubular shell in its engaged relation with said rigidly secured tubular shell, comprising an exteriorly threaded flange connected with said rigidly secured tubular shell, an external annular rib connected with said telescoping tubular shell, an internally screw-threaded lock-ring adapted to screw upon said exteriorly threaded flange, an internal annular rib connected with said lock-ring adapted to be brought into holding engagement with said external annular rib of said telescoping tubular shell.

6. In a device of the character described, a rigidly secured tubular shell, an insulator-disk mounted therein, female contact-members supported by said insulator-disk, a removable telescoping tubular shell adapted to engage said rigidly secured tubular shell, an insulator-disk mounted within said telescoping tubular shell, male contact-members supported thereby, a cable receiving means connected with said telescoping tubular shell, means for rigidly locking said telescoping tubular shell in its engaged relation with said rigidly secured tubular shell, comprising an exteriorly threaded flange connected with said rigidly secured tubular shell, an external annular rib connected with said telescoping tubular shell, an internally screw-threaded lock-ring adapted to screw upon said exteriorly threaded flange, an internal annular rib connected with said lock-ring adapted to be brought into holding engagement with said external annular rib of said telescoping tubular shell, and guiding means connected with said respective shells for registering the same in proper relation with each other.

7. In a device of the character described, a rigidly secured tubular shell, an insulator-disk mounted therein, female contact-members supported by said insulator-disk, a removable telescoping tubular shell adapted to engage said rigidly secured tubular shell, an insulator-disk mounted within said telescoping tubular shell, male contact-members supported thereby, a cable-receiving means connected with said telescoping tubular shell, means for rigidly locking said telescoping tubular shell in its engaged relation with said rigidly secured tubular shell, comprising an exteriorly threaded flange connected with said rigidly secured tubular shell, an external annular rib connected with said telescoping tubular shell, an internally screw-threaded lock-ring adapted to screw upon said exteriorly threaded flange, an internal annular rib connected with said lock-ring adapted to be brought into holding engagement with said external annular rib of said telescoping tubular shell, and guiding means connected with said respective shells for registering the same in proper relation with each other, comprising a vertical channel exteriorly disposed upon said rigidly secured tubular shell, and a key interiorly disposed upon said telescoping tubular shell.

8. A coupling for connecting the field-wires of a motor with the potential feed-wires, comprising a fixed shell, means for rigidly securing said fixed shell to the motor, an insulator-disk mounted within said fixed shell, upwardly extending female contact-members carried by said insulator-disk, means for connecting the motor-field wires with said female contact-members, an exteriorly screw-threaded annular flange at the lower end of said fixed shell, a removable shell adapted to telescope over said fixed shell, means for rigidly connecting a feed-wire cable with relation to said removable shell, an insulator-disk mounted within said removable shell, downwardly extending male contact-members carried by said insulator disk and adapted to contact with said female contact-members when said fixed shell is engaged by said removable shell, means for connecting the feed-wires of said feed-cable with said male contact-members, an interiorly screw-threaded lock-ring adapted to engage said exteriorly screw-threaded annular flange of said fixed shell, and means connected with said removable shell adapted to be engaged by said locking ring to rigidly bind said shells in their assembled relation.

9. A coupling for connecting the field-wires of a motor with the potential feed-wires, comprising a fixed shell, means for rigidly securing said fixed shell to the motor, an insulator-disk mounted within said fixed shell, upwardly extending female contact-members carried by said insulator-disk, means for connecting the motor-field wires with said female contact-members, an exteriorly screw-threaded annular flange at the lower end of said fixed shell, a removable shell adapted to telescope over said fixed shell, means for rigidly connecting a feed-wire cable with relation to said removable shell, an insulator-disk mounted within said removable shell, downwardly extending male contact-members carried by said insulator disk and adapted to contact with said female contact-members when said fixed shell is engaged by said removable shell, means for connecting the feed-wires of said feed-cable with said male contact-members, an interiorly screw-threaded lock-ring adapted to engage said exteriorly screw-threaded annular flange of said fixed shell, and means connected with said removable shell adapted to be engaged by said locking ring to rigidly bind said shells in their assembled relation, and guiding means connected with said respective shells for registering the same in proper relation with each other.

10. A coupling for connecting the field-wires of a motor with the potential feed-wires, comprising a fixed shell, means for rigidly securing said fixed shell to the motor, an insulator-disk mounted within said fixed shell, upwardly extending female contact-members carried by said insulator-disk, means for connecting the motor-field wires with said female contact-members, an exteriorly screw-threaded annular flange at the lower end of said fixed shell, a removable shell adapted to telescope over said fixed shell, means for rigidly connecting a feed-wire cable with relation to said removable shell, an insulator-disk mounted within said removable shell, downwardly extending male contact-members carried by said insulator disk and adapted to contact with said female contact-members when said fixed shell is engaged by said removable shell, means for connecting the feed-wires of said feed-cable with said male contact-members, an interiorly screw-threaded lock-ring adapted to engage said exteriorly screw-threaded annular flange of said fixed shell, and means connected with said removable shell adapted to be engaged by said locking ring to rigidly bind said shells in their assembled relation, and guiding means connected with said respective shells for registering the same in proper relation with each other, comprising a vertical channel exteriorly disposed upon said fixed shell, and a key interiorly disposed upon said movable shell adapted to ride in said vertical channel.

In testimony, that I claim the invention set forth above I have hereunto set my hand this 8th day of November, 1911.

GEORGE J. HARTMANN.

Witnesses:
GEORGE D. RICHARDS,
ADOLPH HANSEN.